(12) United States Patent
Yoshiyama et al.

(10) Patent No.: US 7,250,701 B2
(45) Date of Patent: Jul. 31, 2007

(54) APPARATUS FOR DETECTING A ROTOR ANGLE OF RELUCTANCE MOTOR

(75) Inventors: Shigeru Yoshiyama, Kariya (JP); Taku Itoh, Aichi-ken (JP); Kiyoshi Kimura, Oobu (JP)

(73) Assignee: DENSO CORPORATION (JP)

( * ) Notice: Subject to any disclaimer, the term of this patent is extended or adjusted under 35 U.S.C. 154(b) by 92 days.

(21) Appl. No.: 11/086,448

(22) Filed: Mar. 23, 2005

(65) Prior Publication Data

US 2005/0212366 A1 Sep. 29, 2005

(30) Foreign Application Priority Data

Mar. 26, 2004 (JP) .............................. 2004-092945

(51) Int. Cl.
 H02K 11/00 (2006.01)
 H02K 29/08 (2006.01)
(52) U.S. Cl. ............ 310/68 B; 310/166; 310/216
(58) Field of Classification Search ......... 310/68 B; 300/216, 166, 168
See application file for complete search history.

(56) References Cited

U.S. PATENT DOCUMENTS

| | | | | |
|---|---|---|---|---|
| 4,482,847 A | * | 11/1984 | Rudich et al. ............ | 318/9 |
| 5,117,143 A | * | 5/1992 | Iddings ............ | 310/191 |
| 5,786,646 A | * | 7/1998 | Newberg et al. ......... | 310/68 B |
| 5,866,962 A | * | 2/1999 | Kim ............ | 310/68 B |
| 5,877,568 A | * | 3/1999 | Maes et al. ............ | 310/68 B |
| 6,153,957 A | * | 11/2000 | Takano ............ | 310/71 |
| 6,680,553 B1 | * | 1/2004 | Takano ............ | 310/68 B |
| 7,057,317 B2 | * | 6/2006 | Kuwert ............ | 310/89 |
| 2001/0015582 A1 | * | 8/2001 | Nakajima ............ | 310/68 B |
| 2003/0227287 A1 | * | 12/2003 | Hori et al. ............ | 310/68 B |
| 2005/0212366 A1 | * | 9/2005 | Yoshiyama et al. ....... | 310/68 B |

FOREIGN PATENT DOCUMENTS

| | | | |
|---|---|---|---|
| JP | 04364348 A | * | 12/1992 |
| JP | 08289506 A | * | 11/1996 |
| JP | 2001309612 A | * | 11/2001 |

* cited by examiner

Primary Examiner—Tamai Karl
(74) Attorney, Agent, or Firm—Nixon & Vanderhye PC (57) ABSTRACT

An end surface of a rotor core is offset from an end surface of a stator core by a predetermined amount in an axial direction going away from Hall ICs. In an operating condition of the motor, magnetomotive forces generating from the stator core induce a thrust force acting on the rotor core. The gap (i.e. distance) between the magnet and the Hall ICs does not exceed a pre-designated appropriate distance, and is stably maintained at a constant level (or range). In other words, the gap (i.e. distance) between the magnet and the Hall ICs can be accurately maintained at the pre-designated appropriate distance by utilizing the magnetic attraction force generating from the stator core.

11 Claims, 12 Drawing Sheets

APPARATUS FOR DETECTING A ROTOR ANGLE OF RELUCTANCE MOTOR

CROSS-REFERENCE TO RELATED APPLICATION

This application is based upon and claims the benefit of priority from earlier Japanese Patent Application No. 2004-92945 filed on Mar. 26, 2004 so that the description of which is incorporated herein by reference.

BACKGROUND OF THE INVENTION

The present invention relates to a rotor angle detecting apparatus for a reluctance motor, which is capable of detecting the rotational angle of rotor core and/or rotor shaft of a reluctance motor.

Figure 1A:
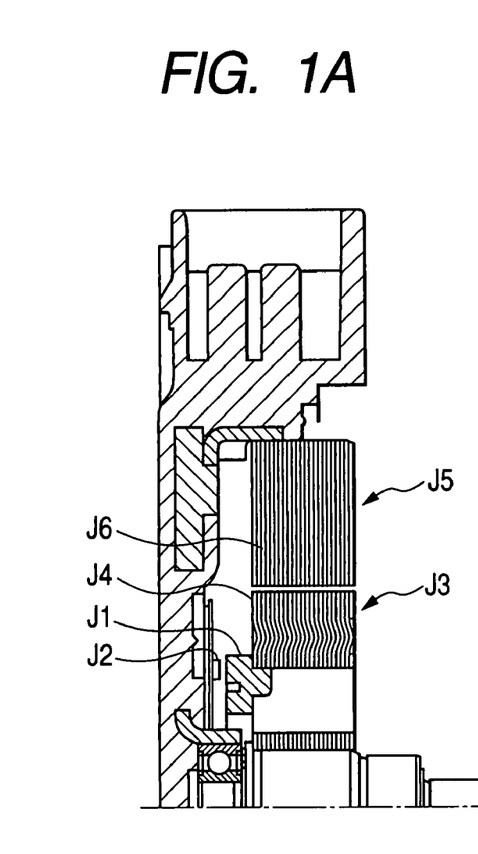
FIGS. 1A to 1C are views explaining the positional relationship between a rotor core and a magnetism detecting element of a reluctance motor.

There is a conventional encoder capable of detecting a rotational angle of a rotor core. This encoder has a magnet attached to an axial end surface of the rotor core and a magnetism detecting element disposed adjacently to this magnet in the axial direction. The magnetism detecting element detects variations of magnetism occurring in this magnet. The magnetic forces generating from this magnet are inverse proportional to the square of distance. Thus, the axial gap between the magnet and the magnetism detecting element must be accurately adjusted to assure reliable detection accuracy of the encoder. Hence, as shown in FIG. 1A, the gap (i.e. distance) between a magnet J1 and a magnetism detecting element J2 should be maintained at a pre-designated appropriate distance, for example, by performing a shim adjustment or the like during assembling processes of this motor.

Figure 1B:
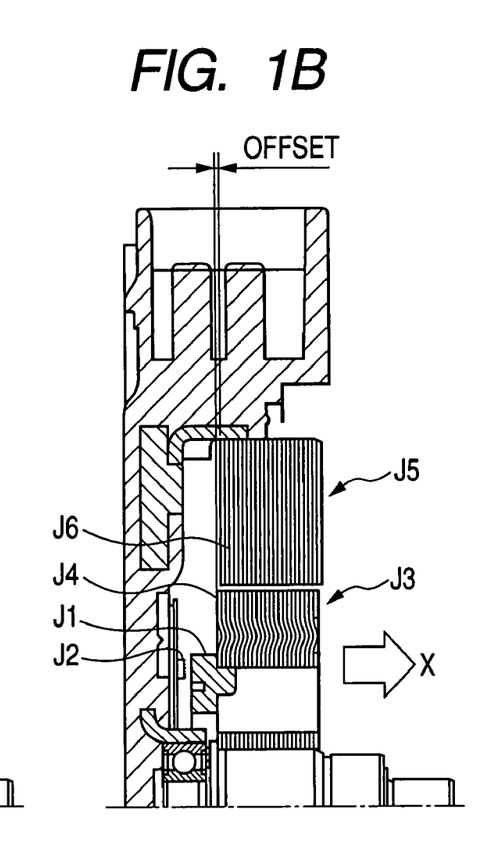

The reluctance motor has a rotor core J3 causing rotations based on magnetic attractions between outward salient-poles J4 (having lower magnetic reluctances) of the rotor core J3 and inward salient-poles J6 of the stator core J5. More specifically, successively switching the combination of inward salient-poles J6 generating magnetomotive forces causes the rotor core J3 to rotate about its rotation center. Therefore, as shown in FIG. 1A, the stator core J5 should be completely opposed to the rotor core J3 in the axial direction. However, as shown in FIG. 1B, there will be the possibility that the rotor core J3 may be unwontedly offset in the axial direction relative to the stator core J5 and, as a result, the rotor core J3 may be dislocated toward the magnetism detecting element J2. In such a case, when the motor is operating (i.e. when electric power is supplied to the coils to generate magnetomotive forces from the inward salient-poles J6), the magnetomotive forces of the stator core J5 will undesirably induce a thrust force X (shown by an arrow) acting on the rotor core J3. If the rotor core J3 is subjected to the thrust force X, the rotor core J3 will shift in the direction indicated by the arrow X (namely, will go away from the magnetism detecting element J2). Thus, there will be the possibility that the gap (i.e. distance) between the magnet J1 and the magnetism detecting element J2 becomes larger than the pre-designated appropriate distance.

SUMMARY OF THE INVENTION

In view of the above-described problems, the present invention has an object to provide a rotor angle detecting apparatus for a reluctance motor which is capable of accurately maintaining the gap (i.e. distance) between the magnet and the magnetism detecting element at a pre-designated appropriate distance by utilizing a thrust force generating when the stator core magnetically attracts the rotor core.

In order to accomplish the above and other related objects, the present invention provides an apparatus for detecting a rotor angle of a reluctance motor with an encoder. The reluctance motor includes a rotor shaft rotatably supported. A rotor core is fixed around the rotor shaft, with a plurality of poles having lower magnetic reluctances and provided at a radial outer side of the rotor core. A stator core is disposed at a radial outer side of the rotor core, with a plurality of inward salient-poles facing toward the rotor core. Furthermore, the reluctance motor includes a plurality of coils causing the inward salient-poles to generate magnetomotive forces, so that the rotor shaft rotates integrally with the rotor core based on magnetic attraction between the poles of the rotor core and the inward salient-poles and the stator core. The encoder includes a magnet provided at an axial end surface of the rotor core and integrally rotating with the rotor core, with magnetic poles varying in a rotational direction. A magnetism detecting element is supported in a confronting relationship with the magnet in an axial direction for detecting magnetism generating from the magnet. The encoder detects a rotational angle of the rotor core based on the magnetism generating from the magnet detected by the magnetism detecting element. Furthermore, the motor is arranged so that the magnetomotive forces of the stator core can induce a thrust force acting on the rotor core in a direction approaching to the magnetism detecting element.

According to the rotor angle detecting apparatus for a reluctance motor of the present invention, magnetomotive forces generating from the stator core induce a thrust force acting on the rotor core in the axial direction approaching to the magnetism detecting element. Thus, the stator core magnetically attracts the rotor core so as to shift it toward the magnetism detecting element. The gap (i.e. distance) between the magnet and the magnetism detecting element does not exceed a pre-designated appropriate distance. Thus, the gap (i.e. distance) between the magnet and the magnetism detecting element can be stably maintained at a constant level (or range). Namely, the present invention provides a rotor angle detecting apparatus for a reluctance motor which is capable of accurately maintaining the gap (i.e. distance) between the magnet and the magnetism detecting element at the pre-designated appropriate distance by utilizing a thrust force generating when the stator core magnetically attracts the rotor core.

According to the rotor angle detecting apparatus of the present invention, it is preferable that the center of the rotor core is offset from the center of the stator core in the axial direction going away from the magnetism detecting element.

According to the rotor angle detecting apparatus of the present invention, it is preferable that the motor is a switched reluctance type, and the rotor core has a plurality of outward salient-poles protruding toward the stator core.

According to the rotor angle detecting apparatus of the present invention, it is preferable that the motor is incorporated in a rotary actuator which generates a rotational torque to drive a shift-range switching apparatus of an automotive automatic transmission.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

As a best mode for embodying the present invention, the inventors of this patent application provide an apparatus for detecting a rotor angle of a reluctance motor with an encoder. The reluctance motor includes a rotor shaft, a rotor core, a stator core, and a plurality of coils. The rotor shaft is rotatably supported. The rotor core is fixed around the rotor shaft, with a plurality of poles having lower magnetic reluctances and provided at a radial outer side of the rotor core. The stator core is disposed at a radial outer side of the rotor core, with a plurality of inward salient-poles facing toward the rotor core. And, the coils cause the inward salient-poles to generate magnetomotive forces. The rotor shaft rotates integrally with the rotor core based on magnetic attraction between the poles of the rotor core and the inward salient-poles of the stator core. The encoder includes a magnet and a magnetism detecting element. The magnet, provided at an axial end surface of the rotor core, integrally rotates with the rotor core. The magnet has magnetic poles varying in a rotational direction. The magnetism detecting element, supported in a confronting relationship with the magnet in an axial direction, detects magnetism generating from the magnet. The encoder detects a rotational angle of the rotor core based on the magnetism generating from the magnet detected by the magnetism detecting element. For example, the motor is arranged so that the center of the rotor core is offset from the center of the stator core by a predetermined amount in the axial direction going away from the magnetism detecting element. Thus, the magnetomotive forces generating from the stator core can induce a thrust force acting on the rotor core in the direction approaching to the magnetism detecting element.

PREFERRED EMBODIMENT

A rotary actuator in accordance with a preferred embodiment of the present invention will be explained with reference to FIGS. 1 to 14. The rotary actuator of this embodiment is for generating a driving force to control a shift-range switching apparatus (including a switching apparatus for a parking lock/unlock mechanism) of an automotive automatic transmission. First of all, the shift-range switching apparatus of the preferred embodiment will be explained.

Shift-Range Switching Apparatus

Figure 2:
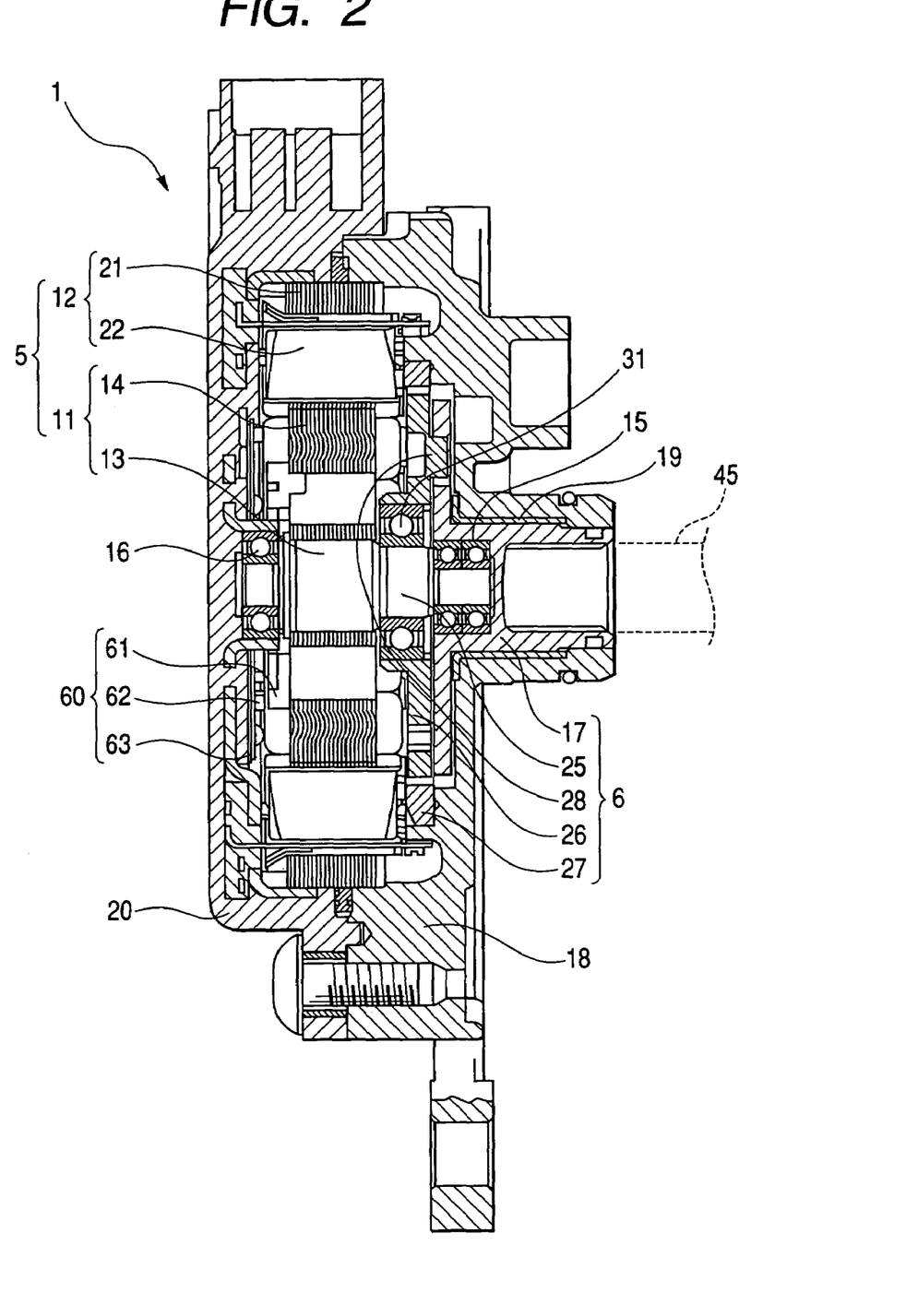
FIG. 2 is a cross-sectional view showing a rotary actuator in accordance with a preferred embodiment of the present invention.

The shift-range switching apparatus is for switching a shift-range switching mechanism 3 (including a parking lock/unlock mechanism 4: refer to FIG. 4) mounted on an automotive automatic transmission 2 (refer to FIG. 3) with the aid of a rotary actuator 1 (refer to FIG. 2). The rotary actuator 1, capable of acting as a servo mechanism for driving the shift-range switching mechanism 3, includes a reluctance-type synchronous motor 5 (hereinafter, referred to as motor) and an inner gearing planetary reduction gear unit 6 (hereinafter, referred to as reduction gear unit). The rotary actuator 1 shown in FIG. 2 has a front part facing rightward and a rear part positioned at the left side.

Motor 5

The motor 5 will be explained with reference to FIGS. 2 and 5. The motor 5 of this embodiment is a switched-reluctance motor (i.e. SR motor) using no permanent magnets. The motor 5 includes a rotor 11 rotating about its rotation center and a stator 12 disposed coaxially with the rotation center of the rotor 11.

The rotor 11 consists of a rotor shaft 13 and a rotor core 14. The rotor shaft 13 has a front end portion rotatably supported by a roller bearing (i.e. a front roller bearing 15) and a rear end portion rotatably supported by a roller bearing (i.e. a rear roller bearing 16). The front roller bearing 15 is firmly fixed to an inner bore of an output shaft 17 of the reduction gear unit 6. The output shaft 17 of the reduction gear unit 6 is rotatably supported by a metal bearing 19 which is disposed on an inner cylindrical surface of a front housing 18. In other words, the front end of the rotor shaft 13 is rotatably supported via the front roller bearing 15, the output shaft 17, and the metal bearing 19 by the boss portion of the front housing 18.

The support section of the metal bearing 19 in the axial direction overlaps with a support section of the front roller bearing 15 in the axial direction. Employing such an overlap arrangement makes it possible to prevent the rotor shaft 13 from inclining due to a reaction force acting in the reduction gear unit 6 (more specifically, a reaction force of the load generating when a later-described external gear 26 meshes with an internal gear 27). On the other hand, the rear roller bearing 16 is supported by a rear housing 20. An outer race of the rear roller bearing 16 is press-fitted into an inner wall of the rear housing 20. And, an inner race of the roller bearing 16 is press-fitted around an outer cylindrical surface of the rear end of the rotor shaft 13.

Figure 5:
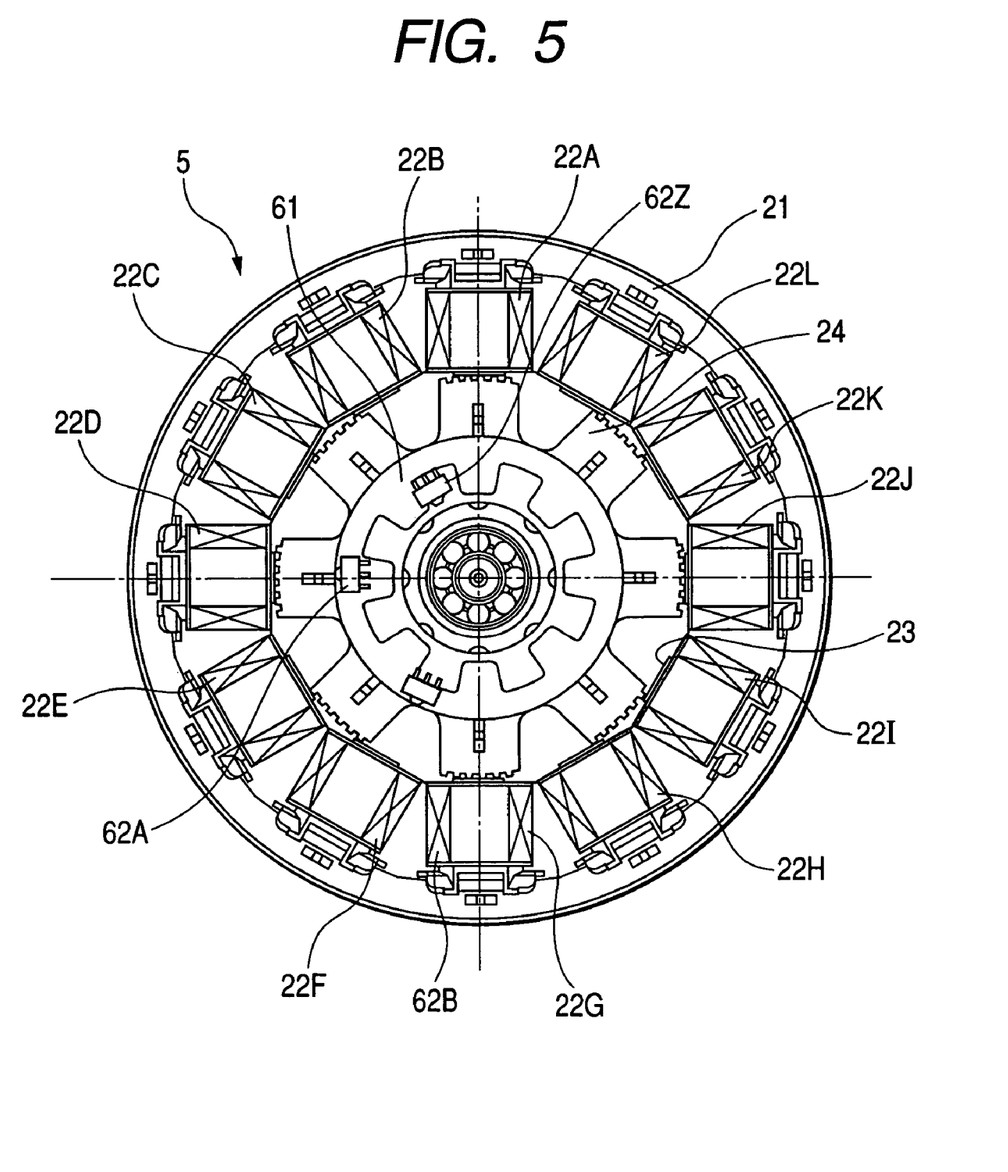
FIG. 5 is a front view showing a motor in accordance with the preferred embodiment of the present invention.
Figure 6:
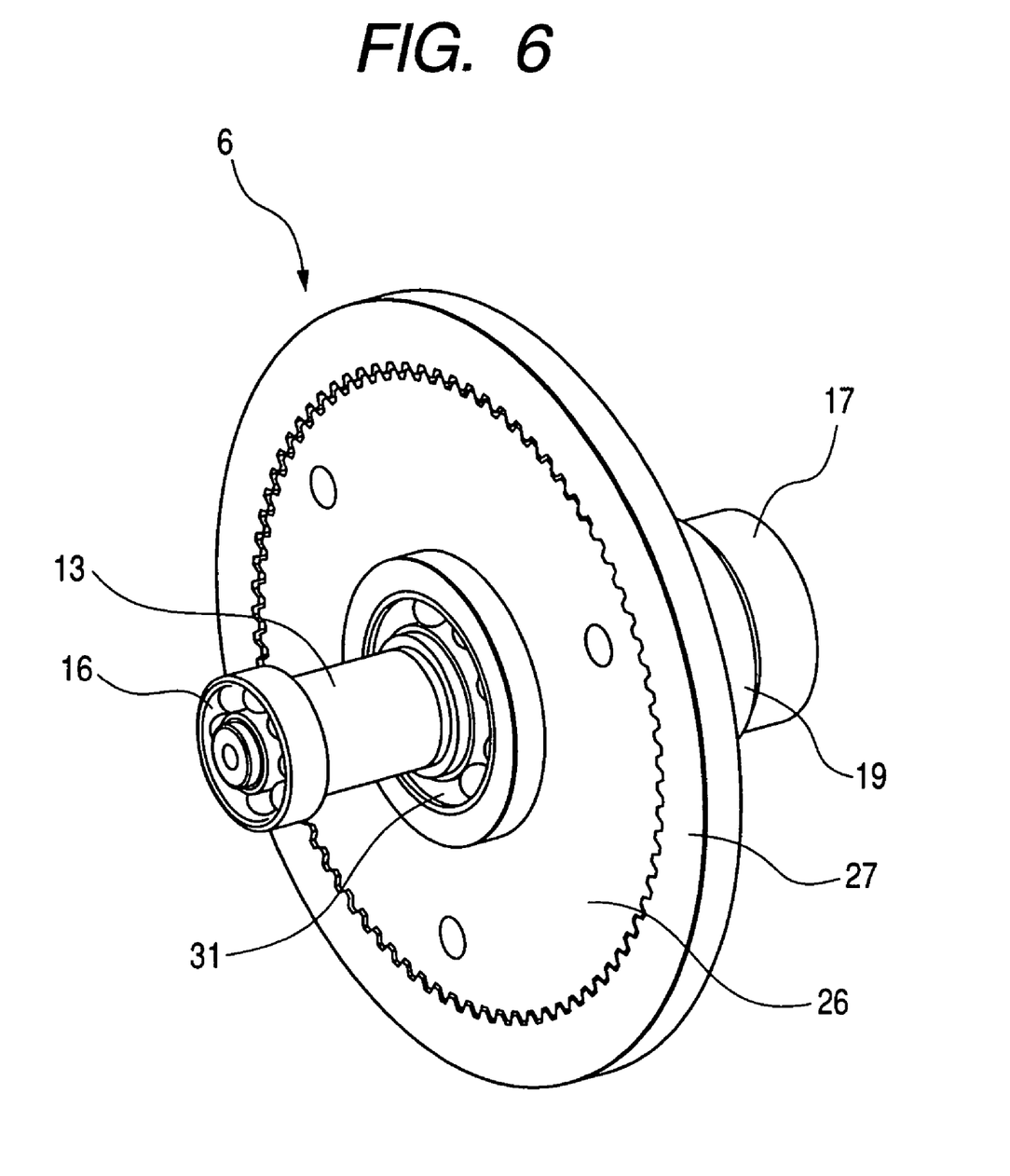
FIG. 6 is a perspective view showing a rear side of a reduction gear unit in accordance with the preferred embodiment of the present invention.
Figure 7:
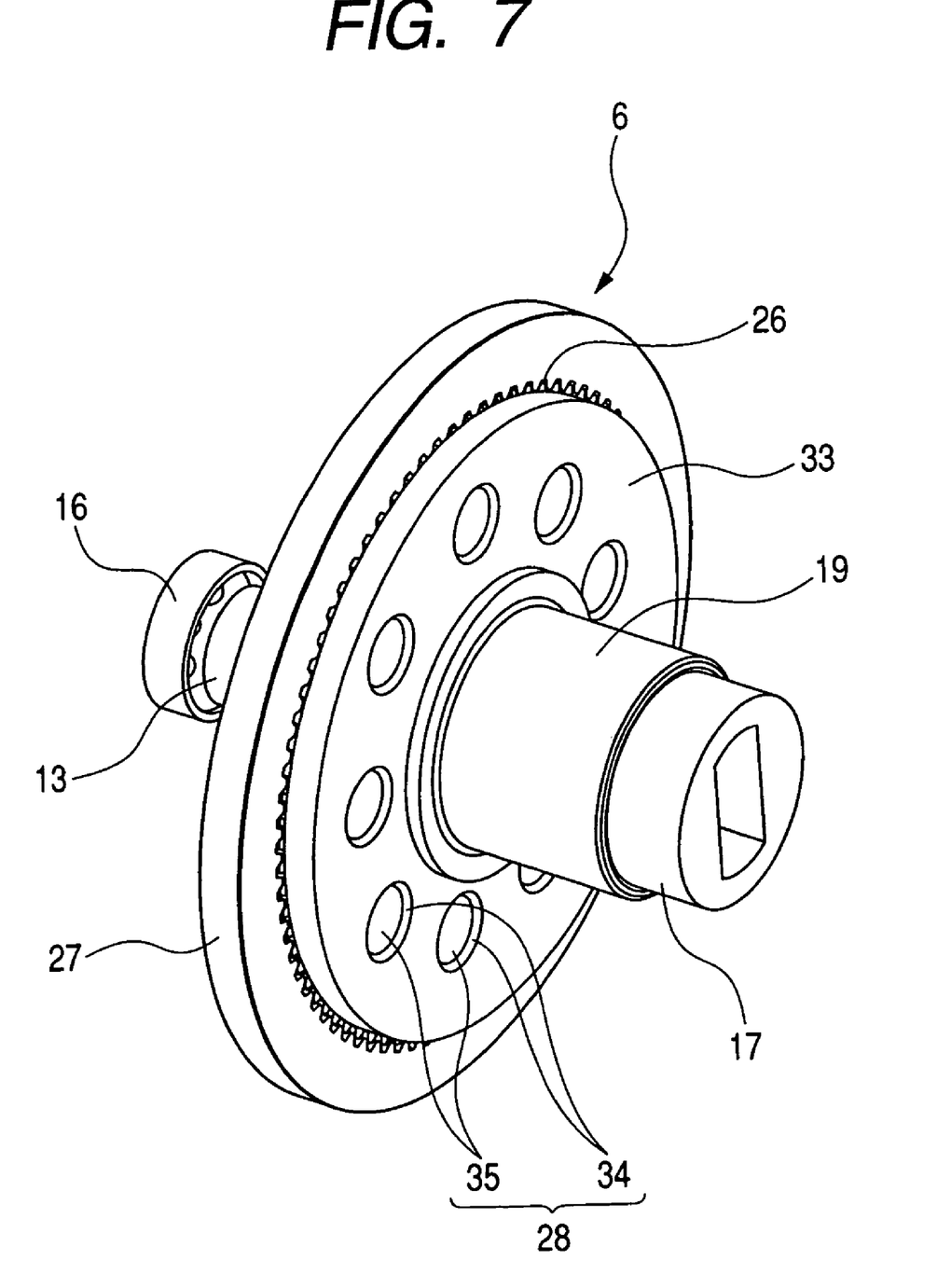
FIG. 7 is a perspective view showing a front side of the reduction gear unit in accordance with the preferred embodiment of the present invention.
Figure 8:
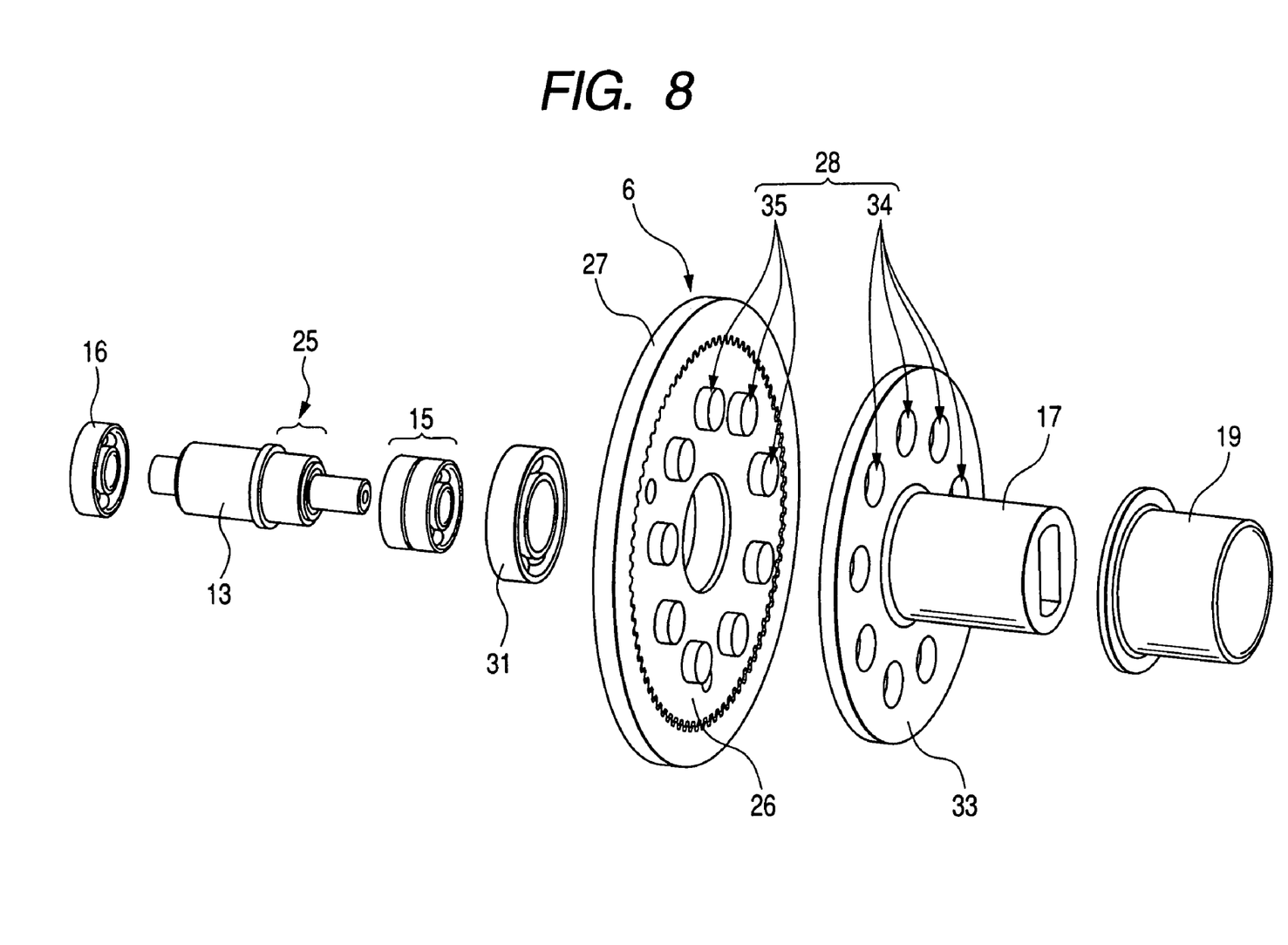
FIG. 8 is an exploded perspective view showing the reduction gear unit in accordance with the preferred embodiment of the present invention.

As shown in FIG. 5, the stator 12 consists of a stator core 21 and a plurality of phase coils 22A to 22L. The stator core 21 has a multilayered body consisting of numerous thin plates being laminated together. The stator core 21 is fixed to the rear housing 20. As shown in FIG. 5, the stator core 21 includes a plurality of inward salient-poles 23 provided at the same angular intervals of 30 degrees. The inward salient-poles 23 face to the rotor core 14 positioned at the radial inner side of the stator core 21. Furthermore, plural phase coils 22A to 22L are wounded around respective inward salient-poles 23, so that respective inward salient-poles 23 can generate magnetomotive forces. Among these plural phase coils, the phase coils 22A, 22D, 22G and 22J cooperatively arrange the U-phase winding, the phase coils 22B, 22E, 22H and 22K cooperatively arrange the V-phase winding, and the phase coils 22C, 22F, 22I and 22L cooperatively arrange the W-phase winding.

The rotor core 14 has a multilayered body consisting of numerous thin plates being laminated together. The rotor core 14 is press-fitted around the rotor shaft 13. As shown in FIG. 5, the rotor core 14 includes a plurality of outward salient-poles 24 (having lower magnetic reluctances) provided regularly at the same angular intervals of 45 degrees. The outward salient-poles 24 protrude toward the stator core 21 positioned at the radial outer side of the rotor core 14. According to this arrangement, a combination of the inward salient-poles 23 capably of magnetically attracting the outward salient-poles 24 successively changes in accordance with sequential change of electric power supply to respective phase coils. More specifically, from the condition shown in FIG. 5, the rotor 11 can rotate in the counterclockwise direction when electric power is sequentially supplied in the order of W-phase coils→V-phase coils→U-phase coils. On the other hand, the rotor 11 can rotate in the clockwise direction when electric power is sequentially supplied in the order of V-phase coils→W-phase coils→U-phase coils. The rotor 11 rotates by an angle of 45 degrees during one complete period of electric power supply to the U-, V-, and W-phase coils.

Reduction Gear Unit 6

Next, the reduction gear unit 6 will be explained with reference to FIGS. 2 and 6 to 8. The reduction gear unit 6 of this embodiment is an inner gearing planetary reduction gear unit (i.e. a cycloid reduction gear unit). The reduction gear unit 6 includes an external gear 26 (i.e. an inner gear: sun gear) causing eccentric rotations about the rotor shaft 13, an internal gear 27 (i.e. an outer gear: ring gear) meshing with the external gear 26, and a transmitting mechanism 28 exclusively transmitting the rotation of the external gear 26 to the output shaft 17. The external gear 26 is supported around an eccentric portion 25 provided on the rotor shaft 13 to cause eccentric rotations about the rotor shaft 13.

The eccentric portion 25 is a shaft portion eccentrically rotating about the rotation center of the rotor shaft 13 to cause the external gear 26 to swing and rotate. The external gear 26 is rotatably supported by an intermediate roller bearing 31 disposed on an outer cylindrical surface of the eccentric portion 25. As described above, the external gear 26 is rotatably supported via the intermediate roller bearing 31 around the eccentric portion 25 of the rotor shaft 13. Thus, the external gear 26 rotates in accordance with rotation of the eccentric portion 25 under the restriction of the internal gear 27. The internal gear 27 is fixed to the front housing 18.

The transmitting mechanism 28 consists of plural pin holes 34 provided on a flange 33 and plural internal pins 35 formed on the external gear 26. The flange 33 integrally rotates with the output shaft 17. The pin holes 34 and the internal pins 35 are arranged at equal angular intervals on the same circle. The internal pins 35 are loosely coupled into the corresponding pin holes 34. Respective internal pins 35 protrude from a front surface of the external gear 26. Respective pin holes 34 are provided on the flange 33. The flange 33 is provided at the rear end of the output shaft 17. The rotational motion of the external gear 26 is transmitted to the output shaft 17 via a coupling or engagement of the internal pins 35 and the pin holes 34. With this arrangement, the external gear 26 rotates eccentrically in response to the rotation of the rotor shaft 13. In other words, the external gear 26 rotates at a reduced speed compared with the rotor shaft 13. The output shaft 17 rotates together with the external gear 26 at the reduced speed. The output shaft 17 is connected to a later-described control rod 45 of the shift-range switching mechanism 3. It is however possible, as a modified embodiment, to form the plural pin holes 34 on the external gear 26 and provide the plural internal pins 35 on the flange 33.

Shift-Range Switching Mechanism 3

Next, the shift-range switching mechanism 3 will be explained with reference to FIG. 4. The shift-range switching mechanism 3 (including the parking lock/unlock mechanism 4) is switched and actuated with the output shaft 17 of the above-described reduction gear unit 6. In general, switching of respective shift ranges (e.g. P, R, N, and D) of an automotive automatic transmission 2 can be accomplished by shifting a manual spool valve 42 to an appropriate position. The manual spool valve 42 is provided in a hydraulic control box 41.

On the other hand, switching of lock and unlock in the parking lock/unlock mechanism 4 can be realized by engaging or disengaging a projection 44a of a park pole 44 with or from a recess 43a of the park gear 43. The park gear 43 is connected to an output shaft (not shown) of the automatic transmission 2 via a differential gear (not shown). The engagement of the park gear 43 and the park pole 44 restricts the rotation of the park gear 43 and locks drive wheels (not shown) of an automotive vehicle. Thus, the parking lock/unlock mechanism 4 establishes the lock condition.

The control rod 45 driven by the reduction gear unit 6 has a detent plate 46 having a sector shape. The detent plate 46 is attached to the control rod 45 by using a spring pin (not shown) or the like. The detent plate 46 has a plurality of recesses 46a provided along a radial outer end thereof (i.e. are edge of the sector plate). A leaf spring 47 fixed to the hydraulic control box 41 can engage with one of plural recesses 46a, so as to hold the shift range being selected.

A pin 48 attached to the detent plate 46 is for driving the manual spool valve 42. More specifically, the pin 48 engages with a groove 49 provided at a distal end of the manual spool valve 42. When the detent plate 46 rotates about the rotation center of the control rod 45, the manual spool valve 42 engaging with the pin 48 can shift straight in the hydraulic control box 41.

Figure 4:
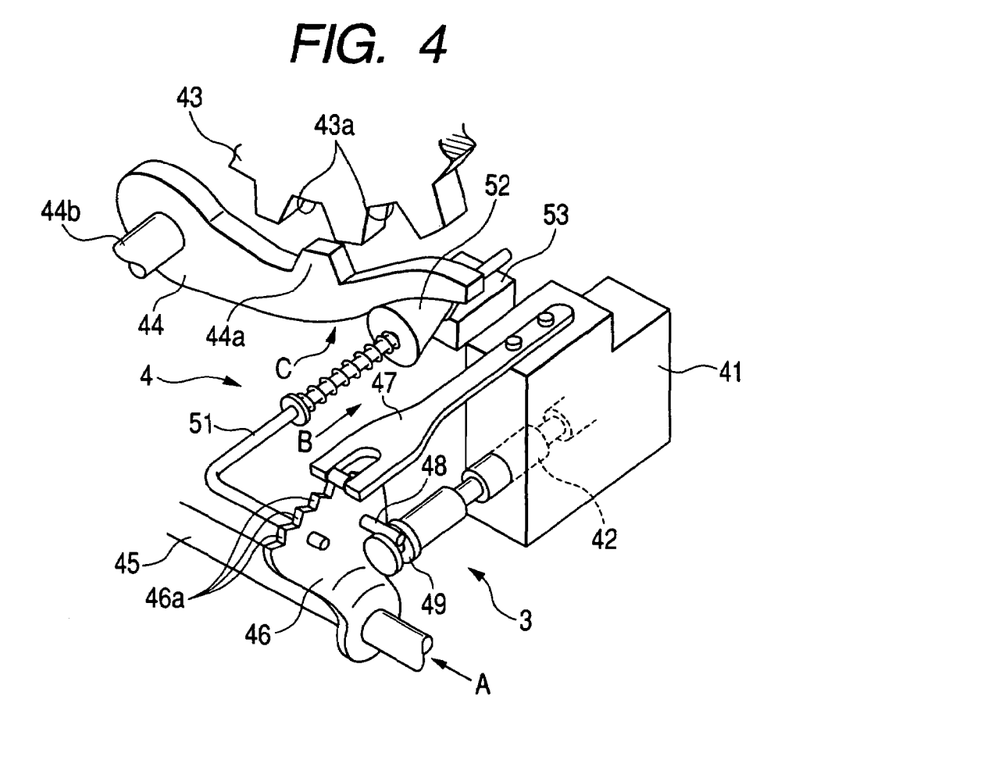
FIG. 4 is a perspective view showing a shift-range switching mechanism including a parking lock/unlock mechanism in accordance with the preferred embodiment of the present invention.

When seen from the direction of arrow 'A' shown in FIG. 4, the clockwise rotation of the control rod 45 is transmitted via the detent plate 46 and the pin 48 to push the manual spool valve 42. The manual spool valve 42 shifts rightward in the hydraulic control box 41. The hydraulic path in the hydraulic control box 41 is switched in order of D→N→R→P in accordance with the shifting position of the manual spool valve 42. In other words, the range of automatic transmission 2 is switched in order of D→N→R→P. Furthermore, the counterclockwise rotation of the control rod 45 is transmitted via the detent plate 46 and the pin 48 to pull the manual spool valve 42. In this case, the manual spool valve 42 shifts leftward in the hydraulic control box 41. The hydraulic path in the hydraulic control box 41 is switched in order of P→R→N→D in accordance with the shifting position of the manual spool valve 42. In other words, the range of automatic transmission 2 is switched in order of P→R→N→D.

Furthermore, a park rod 51 attached to the detent plate 46 is for driving the park pole 44. The park rod 51 has a conical head 52 provided at its distal end. The conical head 52 is placed between the park pole 44 and a protruded portion 53 of the housing of the automatic transmission 2. When seen from the direction of arrow 'A' shown in FIG. 4, the clockwise rotation of the control rod 45 (for realizing the R→P range change) is transmitted via the detent plate 46 to shift the park rod 51 in the direction of arrow 'B' shown in FIG. 4. The conical head 52 pushes the park pole 44 upward. The park pole 44 rotates about the center of the shaft 44b in the direction of arrow 'C' shown in FIG. 4. The projection 44a of the park pole 44 engages with the recess 43a of the park gear 43. Thus, the parking lock/unlock mechanism 4 establishes the lock condition.

Furthermore, the counterclockwise rotation of the control rod 45 (for realizing the P→R range change) is transmitted via the detent plate 46 to shift the park rod 51 in the direction opposed to the arrow 'B' in FIG. 4. The park pole 44 is lowered. The park pole 44 is resiliently pressed by a torsion coil spring (not shown) in the direction opposed to the arrow C shown in FIG. 4. The projection 44a of the park pole 44 disengages from the recess 43a of the park gear 43. The park gear 43 can rotate freely. Thus, the parking lock/unlock mechanism 4 establishes the unlock condition.

Encoder 60

Next, the encoder 60 will be explained with reference to FIGS. 1, 2 and 9 to 14. The above-described rotary actuator 1 has an encoder 60 mounted on the housing (consisting of the front housing 18 and the rear housing 20). The encoder 60 has the capability of detecting a rotational angle of the rotor 11. The encoder 60 detecting the rotational angle of the rotor 11 enables the motor 5 to realize high-speed operations without causing any step out.

The encoder 60 is an incremental type including a magnet 61 integrally rotating with the rotor 11, magnetic detecting Hall ICs 62 disposed in the rear housing 20 (consisting of first and second rotational angle detecting Hall ICs 62A and 62B and a single index Hall ICs 62Z), and a substrate 63 supporting these Hall ICs 62 in the rear housing 20. The magnetic detecting Hall ICs 62 cooperatively serve as a magnetism detecting element of the present invention.

The magnet 61, having a ring disk shape as shown in FIGS. 9 to 12, is disposed coaxially with the rotor shaft 13. The magnet 61 is connected to an end surface (i.e. rear surface) of the rotor core 14 in the axial direction. If there is the possibility that the rotor core 14 may give adverse magnetic effect to the magnet 61, it will be preferable to dispose a non-magnetic membrane member (not shown) between the magnet 61 and the rotor core 14 to weaken or lessen the influence of the magnetic force. Otherwise (i.e. when the magnetic effect given from the rotor core 14 to the magnet 61 is small), the magnet 61 can be directly connected to the rotor core 14. This will bring the effects of reducing the total number of parts and accordingly reducing the manufacturing costs.

The magnet 61 is a magnetized magnetic member. As one practical example, the magnet 61 is a neodium magnet (one example of rare-earth magnets) having a predetermined thickness in the axial direction. The magnet 61, generating a magnetic force, can magnetically join with the rotor core 14. As one practical example, the magnet 61 has a contact surface being magnetized and connected with the rotor core 14 with a magnetic force generated from the magnetized contact surface. Alternatively, it is possible to use an appropriate adhesive to bond the magnet 61 with the rotor core 14.

Figure 11:
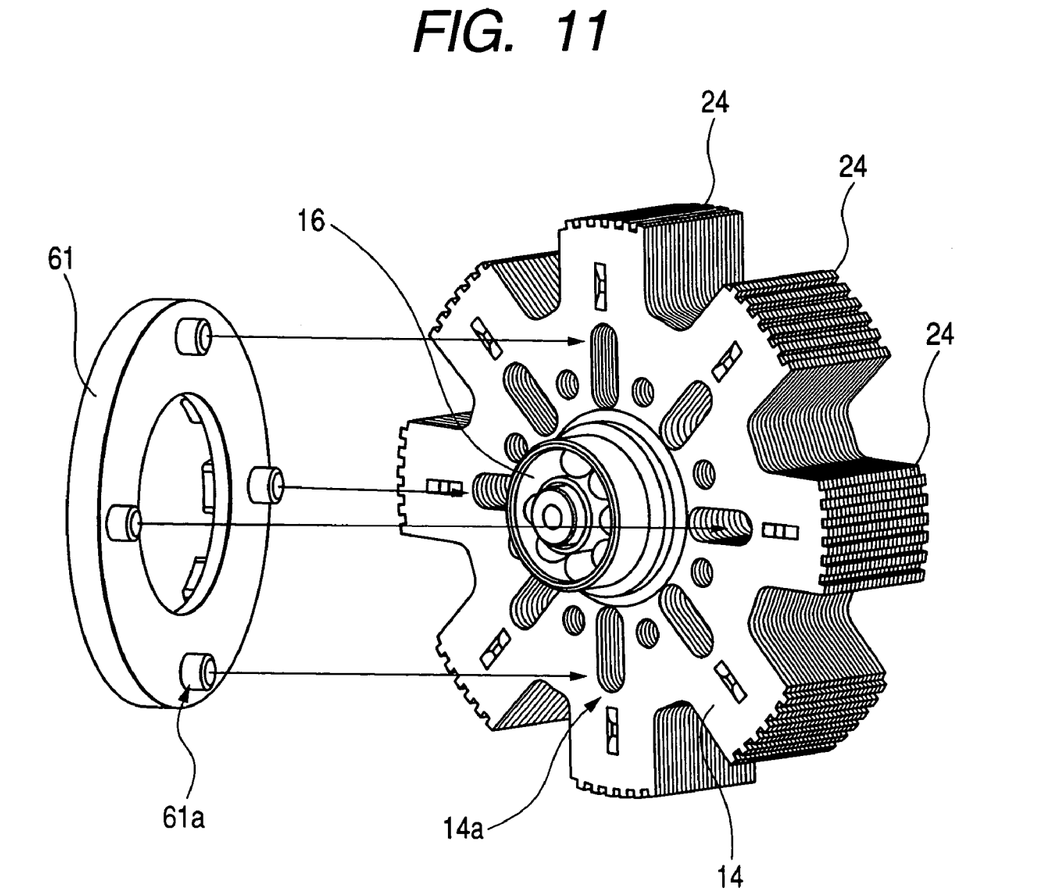
FIG. 11 is a perspective view explaining the assembling of the magnet and a rotor core in accordance with the preferred embodiment of the present invention.

As shown in FIG. 11, the rotor core 14 has a plurality of magnet positioning holes 14a provided on its rear surface. On the other hand, the magnet 61 has a plurality of projections 61a provided on its contact surface to be jointed with the rotor core 14. The magnet 61 can be coaxially assembled with the rotor core 14 by inserting the projections 61a of the magnet 61 into the holes 14a of the rotor core 14.

Figure 9A:
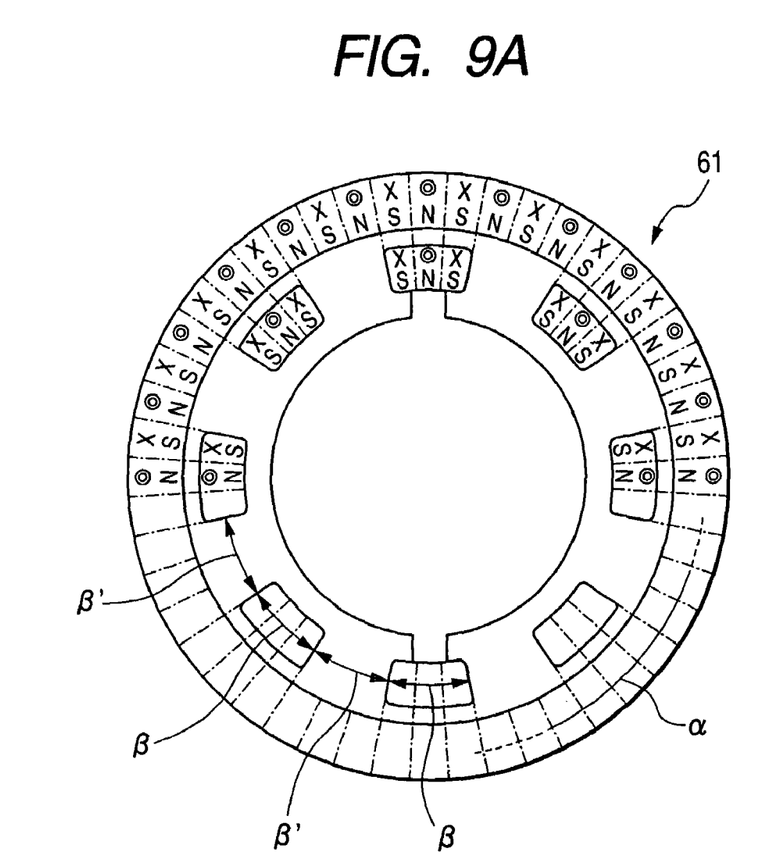
FIGS. 9A and 9B are plan and cross-sectional views showing magnetization of a magnet in accordance with the preferred embodiment of the present invention.
Figure 9B:
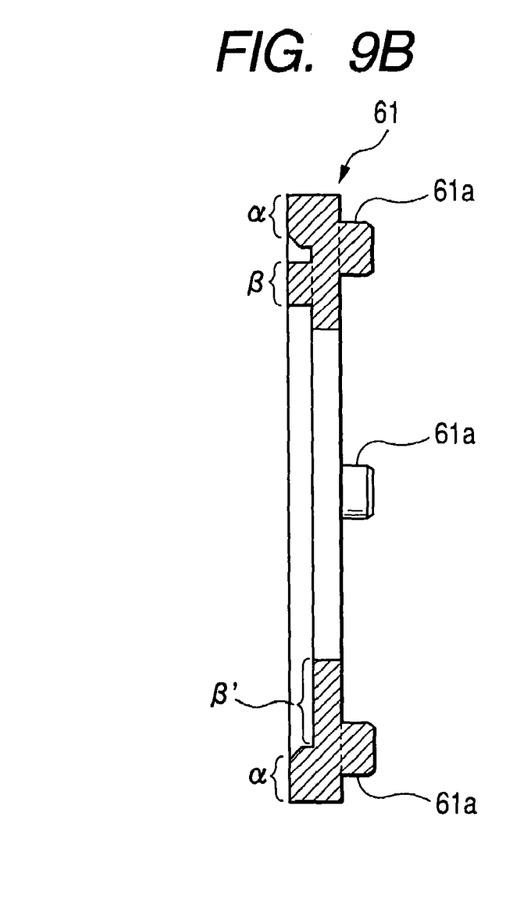
Figure 10:
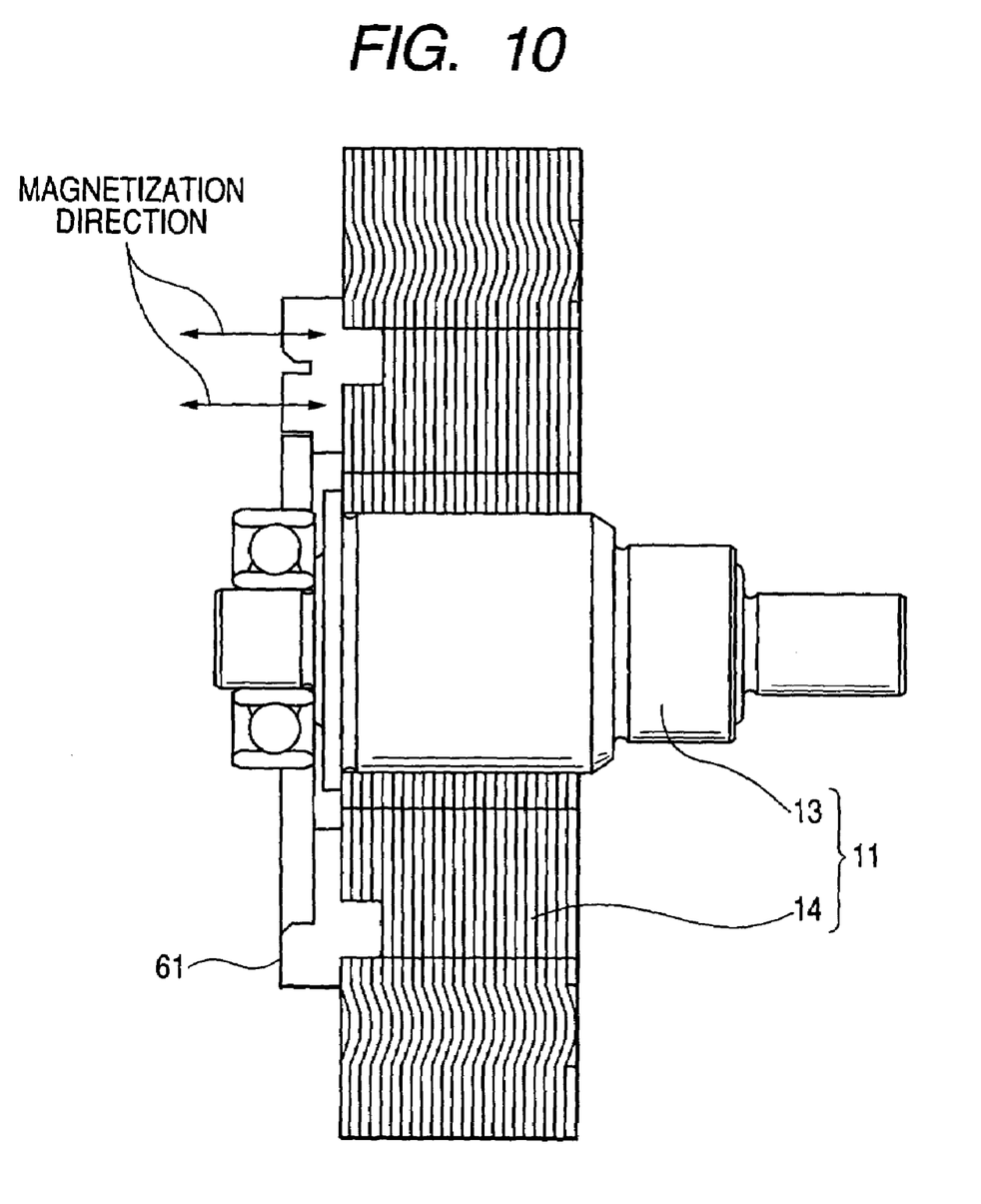
FIG. 10 is a cross-sectional view showing a rotor assembled with the magnet in accordance with the preferred embodiment of the present invention.

The magnet 61 of this embodiment is connected to the rotor core 14, and then magnetization for detecting rotational angle and index is applied on a surface opposing to the Hall ICs 62 (i.e. rear surface). Thus, the magnet 61 can generate magnetic forces in the axial direction as shown in FIG. 10. Hereinafter, the magnetization applied on the surface opposing to the Hall ICs 62 (i.e. rear surface) will be explained in detail. As shown in FIGS. 9A and 9B, the magnet 61 has a rotational angle magnetizing section α provided along the outer periphery on its rear surface. The rotational angle magnetizing section α is applied multipolar magnetization extending in the rotational direction for generating/stopping the rotational angle signal. Furthermore, the magnet 61 has index magnetizing sections β and index non-magnetizing sections β' alternately extending in the rotational direction and positioned at the radial inner side of the rotational angle magnetizing section α. Each index magnetizing sections β is magnetized for generating/stopping the index signal. Each index non-magnetizing sections β' is not relevant to generation of the index signal.

Figure 12:
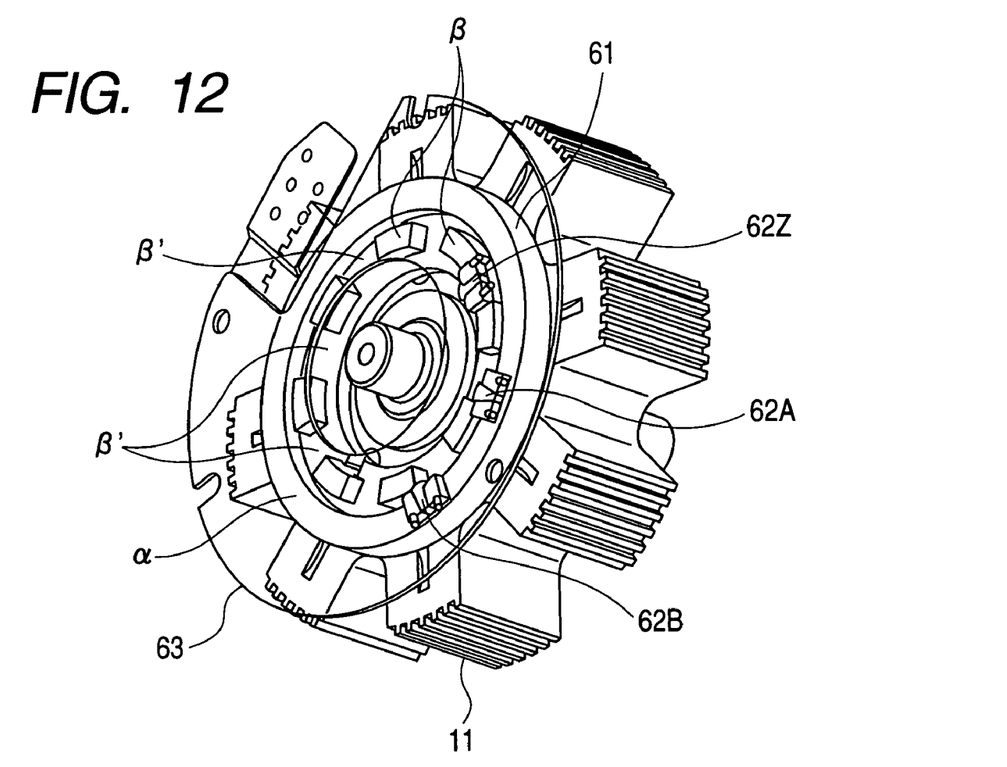
FIG. 12 is a perspective view showing an encoder in accordance with the preferred embodiment of the present invention.

According to the magnet 61 of this embodiment, as shown in FIG. 12, the index non-magnetizing sections β' are provided as recessed portions so as to have large gaps against the index Hall ICs 62Z. The index non-magnetizing sections β' are recessed forward relative to the index Hall ICs 62Z. In other words, both the rotational angle magnetizing section α and the index magnetizing sections β are provided as protruded islands. Only the protruded surfaces of these islands are magnetized. The index non-magnetizing sections β' being not magnetized are thus recessed to provide large gaps between the index non-magnetizing sections β' and the index Hall ICs 62Z.

The multipolar magnetization applied to the rotational angle magnetizing section α is for generating the rotational angle signal (hereinafter, referred to as A-phase signal or B-phase signal), as shown in FIG. 9A. According to this embodiment, N-poles and S-poles are alternately magnetized at the regular pitches of 7.5 degrees. The rotational angle magnetizing section α has a total of 48 polar sections (A- and B-phase sensing sections). The index magnetizing sections β are for generating the index signal (hereinafter, referred to as Z-phase signal) at the cycle (at the intervals of 45 degrees) corresponding to one complete cycle of electric power supply to each phase (U-, V-, W-phase) coil 22. Each index magnetizing section β includes a Z-phase signal generating N-pole and two S-poles positioned at both ends of this N-pole. The Z-phase signal generating N-poles are magnetized at the regular pitches of 45 degrees. According to this embodiment, N-poles and S-poles of the index magnetizing sections β are angularly agreeable with the N-poles and S-poles of the rotational angle magnetizing section α. It is however possible to arrange the N-poles and S-poles of the index magnetizing sections β so as to disagree with the N-poles and S-poles of the rotational angle magnetizing section α. Furthermore, this embodiment shows the Z-phase signal generating S-poles magnetized at the pitches of 7.5 degrees. However, it is possible to set the pitches of the Z-phase signal generating S-poles so as to partly overlap with the pitches of the rotational angle magnetizing section α. Each index non-magnetizing section β' is positioned between one index magnetizing section β and a neighboring index magnetizing section β (i.e. the gap in the rotational direction), as a portion generating no Z-phase signal. Accordingly, the index non-magnetizing sections β' are not magnetized.

The substrate 63, as shown in FIG. 12, is a member for supporting the first and second rotational angle detecting Hall ICs 62A and 62B so as to face to the rotational angle magnetizing section α and also supporting the index Hall ICs 62Z so as to face to the index magnetizing sections β and the index non-magnetizing sections β'. The first and second rotational angle detecting Hall ICs 62A and 62B are angularly offset by an angle of 3.75 degrees (i.e. 90 degrees in terms of electric angle). As a result, the A-phase signal and the B-phase signal are produced to have a relative phase difference of 3.75 degrees (i.e. 90 degrees in terms of electric angle) as understood from FIG. 14.

Figure 13:
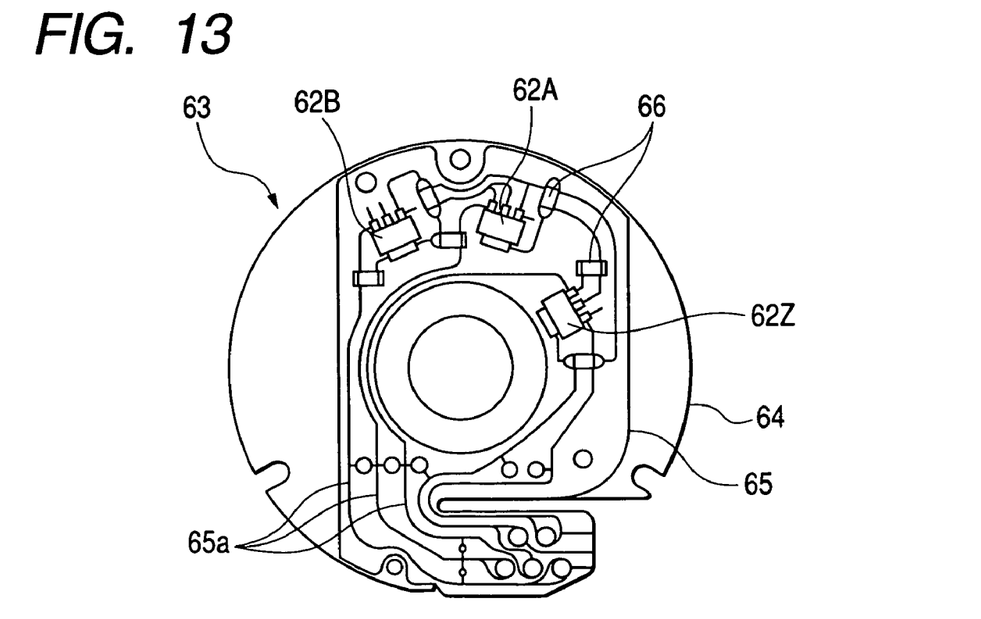
FIG. 13 is a plan view showing a substrate in accordance with the preferred embodiment of the present invention.

The substrate 63 is supported by an inner wall of the rear housing 20. As shown in FIG. 13, the substrate 63 consists of a non-magnetic metallic plate 64 (e.g. aluminum, or stainless) and a film substrate 65 coated on the surface of this metallic plate 64. The film substrate 65 is made of an insulating resin material (e.g. polyimide). It is possible to form the substrate 63 by using a glass-fiber reinforced epoxy substrate. The film substrate 65 has a plurality of circuit patterns 65*a* printed on the surface isolated from the metallic plate 64. In addition to the Hall ICs 62 (62A, 62B, and 62Z), noise filtering capacitors 66 and the like are mounted on the substrate 63. Respective electronic components are electrically connected to the circuit patterns 65*a*. On the other hand, the circuit patterns 65*a* have end portions electrically connected to terminals (not shown) provided in the rear housing 20. The terminals are connected to external connectors.

Each of the first and second rotational angle detecting Hall ICs 62A and 62B and the index Hall ICs 62Z is arranged as an integrated circuit consisting of a hall element and an ON/OFF signal generating circuit. The hall element generates an output corresponding to a magnetic flux having passed. When the magnetic flux density of N-poles given to the hall element exceeds a predetermined threshold (e.g. being set in the range from 0.9 to 5 mT), the Hall ICs generate rotational angle signals (A-phase signal, B-phase signal, and Z-phase signal) of ON state. When the magnetic flux density of S-poles exceeds a predetermined threshold (e.g. being set in the range from −0.9 to −5 mT), the Hall ICs generate rotational angle signals (A-phase signal, B-phase signal, and Z-phase signal) of OFF state. Although this embodiment arranges each Hall ICs by integrating a hall element and an ON-OFF signal generating circuit, it is possible to separately or independently dispose the hall element and the ON-OFF signal generating circuit. More specifically, it is possible to mount the ON-OFF signal generating circuit separately from the hall element on the substrate 63 or incorporate the ON-OFF signal generating circuit into the control circuit (such as ECU 70). Furthermore, this embodiment discloses an example using a magnetic detecting encoder 60 having Hall ICs 62. However, it is possible to use an encoder having pickup coils or an optical encoder.

Figure 14:
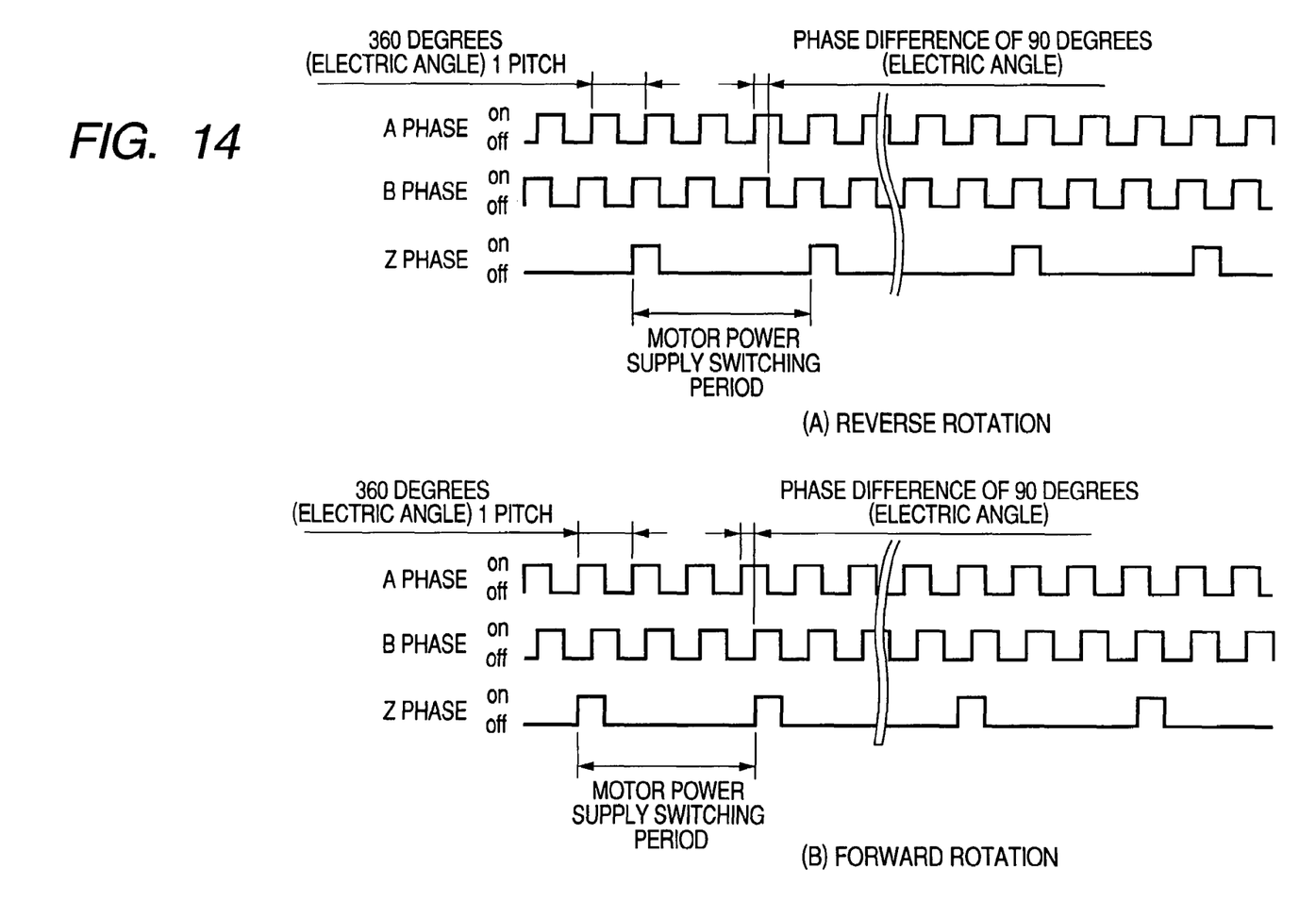
FIG. 14 is a diagram showing output waveforms of A-, B-, and Z-phase signals produced in response to rotation of the rotor in accordance with the preferred embodiment of the present invention.

FIG. 14 shows the output waveforms of the A-phase signal, B-phase signal, and the Z-phase signal produced from the encoder 60. The A-phase signal and the B-phase signal are output signals having a relative phase difference of 3.75 degrees (i.e. 90 degrees in terms of electric angle). According to this embodiment, each of the A-phase signal and the B-phase signal produces an output of one cycle during 15-degree rotation of the rotor 11. The Z-phase signal produces an output every time the rotor 11 rotates 45 degrees. The Z-phase signal is an index signal (ON signal according to this embodiment) for switching electric power supply to the motor. The Z-phase signal defines the electric power supply phase of the motor 5 in relation to the A-phase and B-phase signals.

As explained above, according to the above-described embodiment, the encoder 60 is incorporated in the motor 5. Thus, it becomes possible to downsize the motor 5 mounting the encoder 60. Furthermore, according to this embodiment, the magnet 61 and the Hall ICs 62 are disposed behind the rotor core 14. Accordingly, it becomes possible to reduce or suppress the radial size of the motor 5 mounting the encoder 60. This will improve installability of the motor 5 when it is assembled into an automotive vehicle.

ECU 70

Next, ECU 70 will be explained with reference to FIG. 3. ECU 70 controls the rotation of motor 5 based on the shift position of a range shifting device (not shown) manually operated by an occupant and also based on the rotational angle of the rotor 11 detected by the encoder 60. Furthermore, ECU 70 controls the switching of the shift-range switching mechanism 3 which is driven via the reduction gear unit 6.

Figure 3:
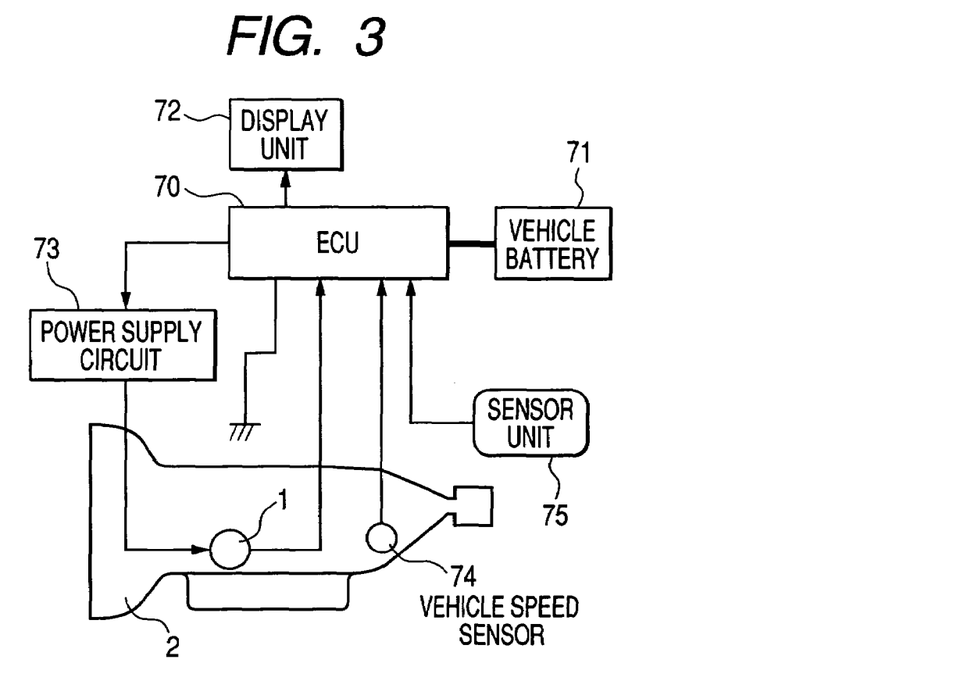
FIG. 3 is a schematic diagram showing a system arrangement of a shift-range switching apparatus in accordance with the preferred embodiment of the present invention.

As shown in FIG. 3, ECU 70 is connected to a vehicle battery 71, a display unit 72 (e.g. visual display, alarm, and buzzer) indicating the shift range and the condition of the rotary actuator 1, a power supply circuit 73 of the motor 5, a vehicle speed sensor 74, and a sensor unit 75 including a range position detecting sensor, a brake switch, and vehicle condition detecting sensors (such as a sensor detecting the rotational angle of the output shaft 17).

Characteristics of the Preferred Embodiment

The magnetic forces generating from the N-poles and S-poles of the magnet 61 toward the Hall ICs 62 (i.e. 62A, 62B, and 62Z) are inverse proportional to the square of distance. Thus, the axial gap between the magnet 61 and the Hall ICs 62 must be accurately adjusted to assure reliable detection accuracy of the encoder which detects rotational angles. The reluctance motor 5 has the rotor core 14 causing rotations based on magnetic attractions between the outward salient-poles 24 of the rotor core 14 and the inward salient-poles 23 of the stator core 21. More specifically, successively switching the combination of the inward salient-poles 3 generating magnetomotive forces causes the rotor core 14 to rotate about its rotation center. Therefore, as explained with reference to FIG. 1A, the conventional motor was required to position the stator core J5 in a completely confronting relationship with the rotor core J3 in the axial direction. However, as shown in FIG. 1B, there will be the possibility that the rotor core J3 may be offset in the axial direction relative to the stator core J5 due to manufacturing or assembling errors and accordingly the rotor core J3 may be dislocated toward the magnetism detecting element J2. If the reluctance motor operates in this condition, the magnetomotive forces of the stator core J5 will undesirably induce a thrust force X acting on the rotor core J3. If the rotor core J3 is subjected to the thrust force X, the rotor core J3 will shift in the direction indicated by the arrow X (namely, will go away from the magnetism detecting element J2). Thus, there is the possibility that the gap (i.e. distance) between the magnet J1 and the magnetism detecting element J2 becomes larger than the pre-designated appropriate distance.

Figure 1C:
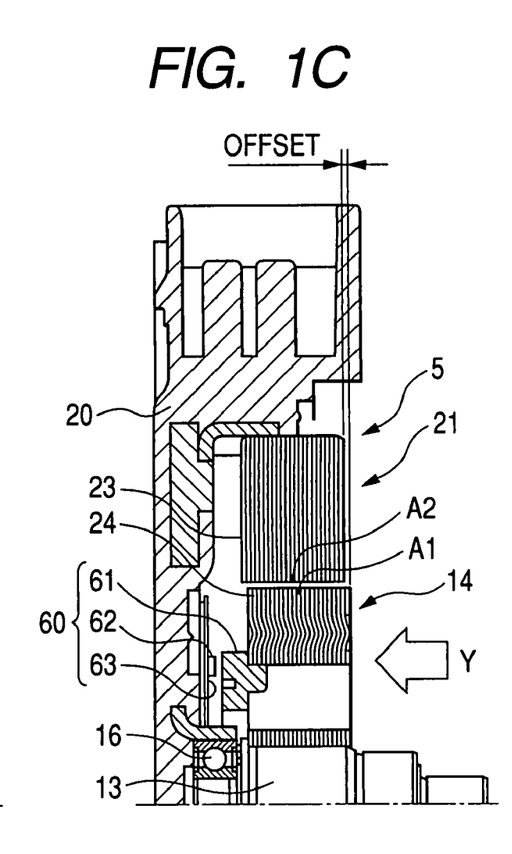

Hence, according to the above-described preferred embodiment of the present invention, the center A1 of the outer periphery of the outward salient-poles 24 in the axial direction (i.e. the center of the rotor core 14 in the axial direction) is offset from the center A2 of the inner periphery of the inward salient-poles 23 in the axial direction (i.e. the center of the stator core 21 in the axial direction) in the direction going away from the Hall ICs 62. More specifically, the stator core 21 and rotor core 14 according to the preferred embodiment have the same thickness in the axial direction. As shown in FIG. 1C, the front end surface of the rotor core 14 is offset forward than the front end surface of the stator core 21 in the axial direction by a predetermined amount. With this arrangement, when electric power is supplied to the coils 22 of the motor 5 (i.e. when the motor 5 operates), the magnetomotive forces generating from the stator core 21 can induce a thrust force Y acting on the rotor core 14 in the direction approaching to the Hall ICs 62 as shown in the drawings.

In the operating condition of the motor 5, the stator core 21 magnetically attracts the rotor core 14 so as to shift it toward the Hall ICs 62. The gap (i.e. distance) between the magnet 61 and the Hall ICs 62 does not exceed a pre-designated appropriate distance. Thus, the gap (i.e. distance) between the magnet 61 and the Hall ICs 62 can be stably maintained at a constant level (or range). Namely, the above-described preferred embodiment of the present invention provides a rotor angle detecting apparatus for a reluctance motor which is capable of accurately maintaining the gap (i.e. distance) between the magnet 61 and the Hall ICs 62 at the pre-designated appropriate distance by utilizing the thrust force Y generating when the stator core 21 magnetically attracts the rotor core 14. In general, it may be possible to use a spring or other resilient member to cause a thrust force Y for shifting the rotor core 14 toward the Hall ICs 62. However, the spring or other resilient member will become a resistance when the rotor 11 rotates. In this respect, the magnetic attraction between the stator core 21 and the rotor core 14 is free from mechanical rotational resistance. Thus, the above-described preferred embodiment can produce the thrust force Y to shift the rotor core 14 toward the Hall ICs 62 without causing any mechanical rotational resistance.

MODIFIED EMBODIMENTS

The above-described preferred embodiment is based upon the encoder which generates the rotational angle signals when the magnetic flux density of N-poles is given to the Hall ICs 62 and stops the rotational angle signals when magnetic flux density of S-poles is given to the Hall ICs 62. However, it is possible to arrange the encoder of the present invention to generate the rotational angle signals when the magnetic flux density of S-poles is given to the Hall ICs 62 and stop the rotational angle signals when magnetic flux density of N-poles is given to the Hall ICs 62. Although the above-described preferred embodiment is based on the encoder 60 detecting the rotational angle of the rotor 11 in the rotary actuator 1 of the shift-range switching apparatus 3, it is possible to apply this invention to an encoder which detects the rotational angle of a rotor of a reluctance motor used as other actuator. Although the above-described preferred embodiment discloses the switched-reluctance motor having salient poles (i.e. rotor teeth) as one example of the reluctance motor, it is possible to apply this invention to an encoder which detects a rotational angle of a rotor of a synchronous reluctance motor.

What is claimed is:

1. An apparatus for detecting a rotor angle of a reluctance motor with an encoder,
said reluctance motor comprising:
a rotor shaft being rotatably supported;
a rotor core fixed around said rotor shaft, with a plurality of poles having lower magnetic reluctances and provided at a radial outer side of said rotor core;
a stator core disposed at a radial outer side of said rotor core with a plurality of inward salient-poles facing toward said rotor core; and
a plurality of coils causing said inward salient-poles to generate magnetomotive forces, so that said rotor shaft rotates integrally with said rotor core based on magnetic attraction between said poles of the rotor core and said inward salient-poles and the stator core,
said encoder comprising:
a magnet provided at an axial end surface of said rotor core and integrally rotating with said rotor core, with magnetic poles varying in a rotational direction; and
a magnetism detecting element supported in a confronting relationship with said magnet in an axial direction for detecting magnetism generating from said magnet, so that said encoder detects a rotational angle of said rotor core based on the magnetism generating from said magnet detected by said magnetism detecting element,
wherein an axial center of said rotor core is offset from an axial center of said stator core by a predetermined amount in an axial direction going away from said magnetism detecting element so that the magnetomotive forces of said stator core can induce a thrust force acting on said rotor core in a direction toward said magnetism detecting element and so that a gap between the magnet and the magnetism detecting element is maintained at a predetermined amount.

2. The rotor angle detecting apparatus for a reluctance motor in accordance with claim 1, wherein said motor is a switched reluctance type, and said rotor core has a plurality of outward salient-poles protruding toward said stator core.

3. The rotor angle detecting apparatus for a reluctance motor in accordance with claim 1, wherein said motor is incorporated in a rotary actuator which generates a rotational torque to drive a shift-range switching apparatus of an automotive automatic transmission.

4. The rotor angle detecting apparatus in accordance with claim 3, wherein the shift-range switching apparatus is for switching a shift-range switching mechanism including a parking lock/unlock mechanism of said automotive automatic transmission.

5. The rotor angle detecting apparatus in accordance with claim 1, wherein said rotor shaft is rotatably supported at a front end portion thereof by a front roller bearing and at a rear end portion thereof by a rear roller bearing.

6. The rotor angle detecting apparatus in accordance with claim 5, wherein said front roller bearing is fixed to an inner bore of an output shaft of a reduction gear unit rotatably supported by a metal bearing disposed in an inner cylindrical surface of a front housing whereby the front end of the rotor shaft is rotatably supported via the front roller bearing, the output shaft, and the metal bearing by the front housing.

7. The rotor angle detecting apparatus in accordance with claim 6, wherein said rear roller bearing is supported by a rear housing.

8. The rotor angle detecting apparatus in accordance with claim 1, wherein said plurality of poles having lower magnetic reluctances are provided regularly at angular intervals of 45°.

9. The rotor angle detecting apparatus in accordance with claim 1, wherein said plurality of inward salient-poles are provided regularly at angular intervals of 30°.

10. The rotor angle detecting apparatus in accordance with claim 1, wherein said magnet is a neodium magnet having a predetermined thickness in the axial direction.

11. The rotor angle detecting apparatus in accordance with claim 1, wherein said magnet has a plurality of projections provided on a contact surface thereof to be joined with respective magnet positioning holes provided on a rear surface of the rotor core.

* * * * *